United States Patent Office.

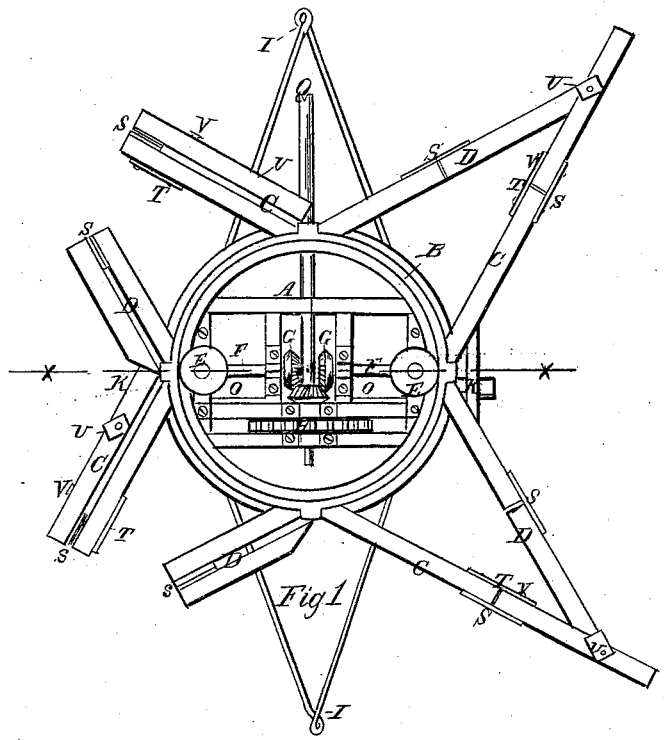

GEORGE OERLLEIN, OF UTICA, MINNESOTA.

Letters Patent No. 93,738, dated August 17, 1869.

IMPROVEMENT IN HORSE-POWER.

The Schedule referred to in these Letters Patent and making part of the same.

*To all whom it may concern:*

Be it known that I, GEORGE OERLLEIN, of the town of Utica, county of Winona, and State of Minnesota, have invented a new and useful Improvement in Horse-Powers; and I do hereby declare that the following is a full, clear, and exact description thereof, which will enable those skilled in the art to make and use the same, reference being had to the accompanying drawing, forming part of this specification, in which—

Figure 1 is a plan view of my invention, and

Figure 2, a sectional view in the line $x$–$x$, fig. 1.

Similar letters of reference in each of the figures indicate corresponding parts.

The object of my invention is to provide a horse-power which will be handy to use, having sweeps with joints in them to fold up, so that the horse-power may pass through narrow places without being taken apart, and being arranged handy on two wheels.

A is the main frame, made four-square.

B, the master-wheel.

C, the main part of the sweeps, made with a joint, so as to fold up.

D, a brace to the main sweep, made so as to fold up also.

E E, trucks on a standard inside of the master-wheel, which serves to keep the master-wheel steady in place.

F F, driving-shafts.

G G, pinions on the driving-shafts F F.

H, driving-wheel.

I, braces to hold the power in position.

K, wheels to move the power from place to place.

L, pinion meshing into pinions G G, and on a shaft on which is wheel H.

M, pinion, meshing into wheel H, and to which a tumbling-rod is to be attached.

N N, pinions on shafts F F, meshing into cogs on the under side of master-wheel B.

O, axle, which supports the works.

P P, rollers or trucks on the standard to which E E are attached, and which holds the master-wheel down.

Q, tongue, which the power is hauled by.

R, standard, to which the trucks E and P are attached.

S, joints in the sweeps and braces.

T, piece to hook over pins on the sweeps at the joints, to hold them firmly.

U, sockets on the sweeps, for the end of braces to enter.

V, pins on the sweeps, for the pieces T to hook over.

Operation.

Set the power in position, staking down braces I I, to hold the power steady. Then straighten out the sweeps and hitch on your horses, and as they pull on the sweeps, the master-wheel will revolve, turning pinions N N, which revolve shafts F F and pinion L, which will revolve wheel H, and that, in turn, pinion M and the tumbling-rods.

What I claim as my invention, and desire to secure by Letters Patent, is—

1. A two-wheeled horse-power, with a square frame, constructed substantially as described.

2. Master-wheel B, with jointed sweeps C and braces D, constructed and arranged substantially as described.

3. Master-wheel B, with trucks E and P, to keep it securely in position, substantially as described.

4. A horse-power, arranged with the large wheel in rear of the axle, so that the axle can run through the whole width of the power without obstruction, constructed substantially as described.

GEORGE OERLLEIN.

Witnesses:
  J. B. SMITH,
  W. M. HORNOR.